United States Patent
Idzerda (10) Patent No.: US 12,091,267 B2
(45) Date of Patent: Sep. 17, 2024

(54) CONTAINER MANIPULATION DEVICE AND HOISTING DEVICE

(71) Applicant: Haulder S.A., Montevideo (UY)

(72) Inventor: Paul Idzerda, Montevideo (UY)

(73) Assignee: HAULDER S.A. (UY)

( * ) Notice: Subject to any disclaimer, the term of this patent is extended or adjusted under 35 U.S.C. 154(b) by 0 days.

(21) Appl. No.: 17/998,971

(22) PCT Filed: May 17, 2021

(86) PCT No.: PCT/IB2021/054210
§ 371 (c)(1),
(2) Date: Nov. 16, 2022

(87) PCT Pub. No.: WO2021/234537
PCT Pub. Date: Nov. 25, 2021

(65) Prior Publication Data
US 2023/0257219 A1    Aug. 17, 2023

(30) Foreign Application Priority Data

May 19, 2020    (NL) ...................................... 2025613

(51) Int. Cl.
*B65G 65/23*    (2006.01)
*B66C 1/10*    (2006.01)

(52) U.S. Cl.
CPC .............. *B65G 65/23* (2013.01); *B66C 1/101* (2013.01); *B65G 2201/042* (2013.01)

(58) Field of Classification Search
CPC .................................................... B65G 65/23
See application file for complete search history.

(56) References Cited

U.S. PATENT DOCUMENTS

| 1,891,032 A | * | 12/1932 | Venable | ................ B28C 7/0454 222/166 |
| 2,756,883 A | * | 7/1956 | Schreck | ................. B65G 65/23 254/31 |

(Continued)

FOREIGN PATENT DOCUMENTS

| CN | 208577187 U | 3/2019 |
| DE | 29917096 U1 | 2/2000 |
| WO | 2014082136 A1 | 5/2014 |

OTHER PUBLICATIONS

International Search Report (ISR) for PCT/IB2021/054210 mailed Jul. 13, 2021 (4 pages).

(Continued)

*Primary Examiner* — Jonathan Snelting
(74) *Attorney, Agent, or Firm* — Shumaker, Loop & Kendrick, LLP; Patrick B. Horne (57) ABSTRACT

The invention provides a container manipulation device comprising a frame, two container engagement members, two pivoting mechanisms for pivoting the engagement members with respect to the frame, the pivoting mechanisms each include a coupler, pivotally connected with a first end to the engagement member at a first distance from the engagement member pivot axis, a rocker, pivotally connected with a first end to the frame and with a second end to a second end of the coupler, and an actuator for pivoting the rocker about the rocker pivot axis such that the engagement member pivots between the first and second orientation. The invention also provides a hoisting device comprising such a container manipulation device.

13 Claims, 6 Drawing Sheets

(56) References Cited

U.S. PATENT DOCUMENTS

| | | | | |
|---|---|---|---|---|
| 3,137,402 | A | * | 6/1964 | Gunn, Jr. ............... B65G 65/23 |
| | | | | 222/165 |
| 3,670,912 | A | * | 6/1972 | Dunbar .................... B66C 1/66 |
| | | | | 414/420 |
| 3,777,920 | A | * | 12/1973 | Wiese .................... B65G 65/00 |
| | | | | 414/421 |
| 4,084,706 | A | * | 4/1978 | Russell .................. B66C 1/625 |
| | | | | 414/640 |
| 4,496,275 | A | * | 1/1985 | Harp ..................... B65G 65/23 |
| | | | | 414/754 |
| 4,930,826 | A | * | 6/1990 | Perren ................. A62C 3/0235 |
| | | | | 294/68.27 |
| 8,585,346 | B2 | * | 11/2013 | Shonai .................... C30B 15/10 |
| | | | | 414/420 |

OTHER PUBLICATIONS

Written Opinion (WO) for PCT/IB2021/054210 mailed Jul. 13, 2021 (8 pages).

\* cited by examiner

CONTAINER MANIPULATION DEVICE AND HOISTING DEVICE

TECHNICAL FIELD

The present invention relates to a container manipulation device and hoisting device comprising such a device.

The present invention generally relates to a device for manipulation of a bulk material container. Such containers have an open upper side and carry bulk material such as minerals and coal. The payload of such containers generally is in the order of tens of tons such as about 45 tons, for example. Such containers may be equipped with a lid which may be removed, such as lifted by a lid lifter, from the upper side of the container so as to provide access to the interior of the container for the purpose of loading or unloading the container. The device according to the present invention is used for the manipulation of such a bulk material container in particular for the purpose of unloading the container.

BACKGROUND

In order to unload bulk material from such a container into the hold of a vessel, for example, the container is coupled to a manipulation device which may be provided on, such as suspended from, a crane such as a gantry crane. Then, the container may be positioned above the hold—or other receiving means—and rotated such that the bulk material is discharged from the container into the hold.

WO 2014/082136 A1 relates to a rotating mechanism to rotate and overturn a cargo or shipping container. By means of two rotating mechanisms between which a container is engaged, the container may be rotated up to about 180 degrees. Each of the two rotating mechanisms comprises a combination of two pivotable arms and two hydraulic cylinders of which a first one is operative between said two arms and a second one is operative between a frame part and one of said arms. This system is relatively costly and requires a relatively complex control system. There is room for improvement regarding the manner in which the rotation of the container is arranged.

SUMMARY

It is an object of the present invention to provide a simple, low cost and easy to operate container manipulation device. It is a general object of the present invention to provide an improved container manipulation device.

In an aspect, the present invention relates to a container manipulation device, for manipulation of a bulk material container, as defined in claim 1. In a further aspect, the invention relates to a hoisting device comprising such a container manipulation device.

According to the invention, a container manipulation device is provided, for manipulation of a bulk material container comprising a bottom and side walls.

The container manipulation device comprises:
  a frame, configured to be provided on a hoisting device,
  two container engagement members provided spaced apart on the frame, each pivotally connected to the frame about a respective transverse engagement member pivot axis, the pivot axes of the two engagement members being coaxial, wherein the engagement members are arranged for engaging the container there between,
  two pivoting mechanisms, one for each container engagement member, arranged for pivoting the engagement members with respect to the frame between a first orientation of the engagement members in which they, in use, orient the container in an upright orientation wherein an upper side of the container faces upwards, and a second orientation of the engagement members in which they, in use, orient the container in an upside-down orientation wherein the bottom of the container faces upwards so that the container may be emptied.

The pivoting mechanisms each include:
  an elongate coupler, pivotally connected with a first end to the engagement member about a coupler pivot axis located at a first distance from the engagement member pivot axis, and having a second, opposite end,
  an elongate rocker, pivotally connected with a first end to the frame about a rocker pivot axis, and with an opposite, second end pivotally connected to the second end of the coupler about a rocker-coupler pivot axis, and
  an actuator for pivoting the rocker about the rocker pivot axis such that the engagement member pivots between the first and second orientation.

An effect of the container manipulation device according to the invention is that because of the improved construction of the pivoting mechanisms for effecting the pivoting of the container, the complexity and cost of the device may be reduced. Also, the device may be more easy to operate, i.e. control, because of the single actuator used for the pivoting. The single actuators for each of the pivoting mechanisms can be operated synchronously more easily. Also, a smaller hydraulic circuit is required in case of hydraulic actuation, further reducing costs of related (hydraulic) equipment and reduces the maintenance costs and reduces the chance of errors. Thus, an improved container manipulation device has been provided.

In an embodiment, the rocker pivot axis is at a second distance from the engagement member pivot axis, wherein the second distance is greater than the first distance. By doing so, an effective transfer of forces from the actuator, via the rocker, to the coupler, may be achieved.

The coupler and the rocker in combination are preferably configured such that in use, during the pivoting of the engagement member between the first and second orientation thereof, a virtual line through the coupler pivot axis and the rocker-coupler pivot axis passes along the engagement member pivot axis at all times. This way, a reliable operation of the device, in particular of the pivoting mechanisms, is safeguarded.

In an embodiment, a length of the coupler between the coupler pivot axis and the rocker-coupler pivot axis, and a length of the rocker between the rocker pivot axis and the rocker-coupler pivot axis, are both greater than the first distance, preferably by a factor in the range of 1.5 to 3, further preferably in the range of 1.75 to 2.5, still further preferably by a factor of about 2.

In an embodiment, a length of the coupler between the coupler pivot axis and the rocker-coupler pivot axis, and a length of the rocker between the rocker pivot axis and the rocker-coupler pivot axis, are both between 0.5 and 1.5, preferably between 0.8 and 1.25, further preferably between 0.9 and 1.1 times the second distance.

In an embodiment, a transmission angle (as defined below) of the pivoting mechanism is in the range of about 120 to 175 degrees, preferably about 140 to 165 degrees, in the upright orientation of the engagement members and in the range of about 5 to 45 degrees, preferably about 10 to 30 degrees, in the upside-down orientation of the engagement members. The transmission angle passes through 90 degrees during the pivoting of the engagement members between the first and second orientation thereof. By doing so, an effective transfer of forces from the rocker to the coupler, may be achieved.

In an embodiment, a pivoting angle of the engagement member between the first and second orientation is in the range of 120 to 200 degrees, preferably between 135 and 185 degrees, more preferably between 150 and 180 degrees. In an embodiment, said pivoting angle is about 180 degrees, so that a container may be pivoted from a fully upright orientation to a fully upside-down orientation.

In an embodiment, the engagement members each have a plate-shaped base part and two coupling elements mounted to the base part such that in use each coupling element can couple to a coupling member at a top corner of the container. The engagement member pivot axis is preferably lower than the coupling elements in the first orientation of the engagement members.

In an embodiment, the engagement members are each pivotally connected to the frame by means of a slewing bearing having the associated engagement member pivot axis as its central axis. The coupler may be pivotally connected with its first end to a rotatable inner ring of the slewing bearing. Alternatively the engagement members are each provided with a pivot fixated thereto, having the engagement member pivot axis 10 as its central axis, which pivot is bearingly mounted on the frame and onto which pivot a crank is fixated, to which crank the coupler is pivotally connected. Analogous to the example shown in the figures, such a crank will be of a length corresponding to distance D1.

In an embodiment, the actuator is an elongate length-adjustable actuator, such as an hydraulic cylinder, arranged to pivot the rocker about the rocker pivot axis as a result of an adjustment of the length of the actuator. In an embodiment the container manipulation device further comprises or may be coupled to a drive for the actuator, arranged to operate the actuator in an automated manner so as to pivot the rocker about the rocker pivot axis.

The device may be configured such that the pivoting motion of the both engagement members are synchronised. To that end, the device may comprise or may be coupled to a single actuator drive, actuating the actuators of both the pivoting mechanisms in a synchronous and in an automated manner. The actuator drive is preferably provided on the device, mounted to the frame.

The elongate, length-adjustable actuator may be pivotally connected with a first end thereof to the frame about an actuator pivot axis, and pivotally connected to the rocker with an opposite, second end thereof about an actuator-rocker pivot axis at the second end of the rocker. In an embodiment, the rocker-coupler pivot axis and the actuator-rocker pivot axis are coaxial.

In an embodiment, the rocker comprises two parallel parts between which the coupler and the actuator are pivotally connected to the rocker and preferably between which the rocker is pivotally connected to the frame. This way, forces from the actuator May be transferred in a straight line to the coupler in the absence of torsional forces on the rocker.

In an embodiment, the actuator is positioned such that an angle between a virtual line through the actuator pivot axis and the actuator-rocker pivot axis and a virtual line through the rocker pivot axis and the actuator-rocker pivot axis remains between about and 135 degrees during the pivoting of the engagement member between the first and second orientation thereof, and preferably amounts to about 35 degrees in the second orientation and about 110 degrees in the first orientation. By doing so, an effective transfer of forces from the actuator to the rocker may be achieved.

In an embodiment, the frame is generally of a C-shape in front view, the legs of the C-shape pointing downwards from a horizontally extending base part of the C-shape, the engagement members being provided on an inner side of both legs, facing towards each other.

In an embodiment, said length of the coupler and said length of the rocker are both greater than the first distance by a factor of about 2, and are both between 0.9 and 1.1 times the second distance, wherein further said transmission angle of the pivoting mechanism is in the range of about 140 to 165 degrees in the upright orientation of the engagement members and in the range of about 10 to 30 degrees in the upside-down orientation of the engagement member, wherein further said pivoting angle of the engagement member between the first and second orientation is between 150 and 180 degrees, wherein further the actuator is positioned such that an angle between a virtual line through the actuator pivot axis and the actuator-rocker pivot axis and a virtual line through the rocker pivot axis and the actuator-rocker pivot axis remains between about 20 and 135 degrees during the pivoting of the engagement member between the first and second orientation thereof, and preferably amounts to about 35 degrees in the second orientation and about 110 degrees in the first orientation.

Generally, the invention provides a container manipulation device comprising a frame, two container engagement members, two pivoting mechanisms for pivoting the engagement members with respect to the frame, the pivoting mechanisms each include a coupler, pivotally connected with a first end to the engagement member at a first distance from the engagement member pivot axis, a rocker, pivotally connected with a first end to the frame and with a second end to a second end of the coupler, and an actuator for pivoting the rocker about the rocker pivot axis such that the engagement member pivots between the first and second orientation.

The present invention also relates to a hoisting device, such as a crane, such as a gantry crane or a bridge crane or a crane on a vessel or a mobile harbour crane or a Ship to Shore (STS) crane, provided with an above-described container manipulation device according to the present invention.

Definitions

The following definitions are used in the present description and claims to define the stated subject matter. Other terms not cited below are meant to have the generally accepted meaning in the field.

"Transmission angle" as used in the present description and claims means the angle between the coupler—or at least a virtual line through the coupler pivot axis and the rocker-coupler pivot axis—and an output link, the output link within the context of the present invention being a crank between the coupler and the engagement member, which, for the purpose of the transmission angle, is defined by a virtual line through the coupler pivot axis and the engagement member pivot axis.

"Coupler" and "rocker" as used in the present description and claims both mean an arm, or, lever, or, link, of a fixed length.

BRIEF DESCRIPTION OF DRAWINGS

The present invention is described hereinafter with reference to the accompanying drawings in which embodiments of the present invention are shown and in which like reference numbers indicate the same or similar elements.

FIG. 2b shows detail IIb of FIG. 2a;

DESCRIPTION OF EMBODIMENTS

Figure 1:
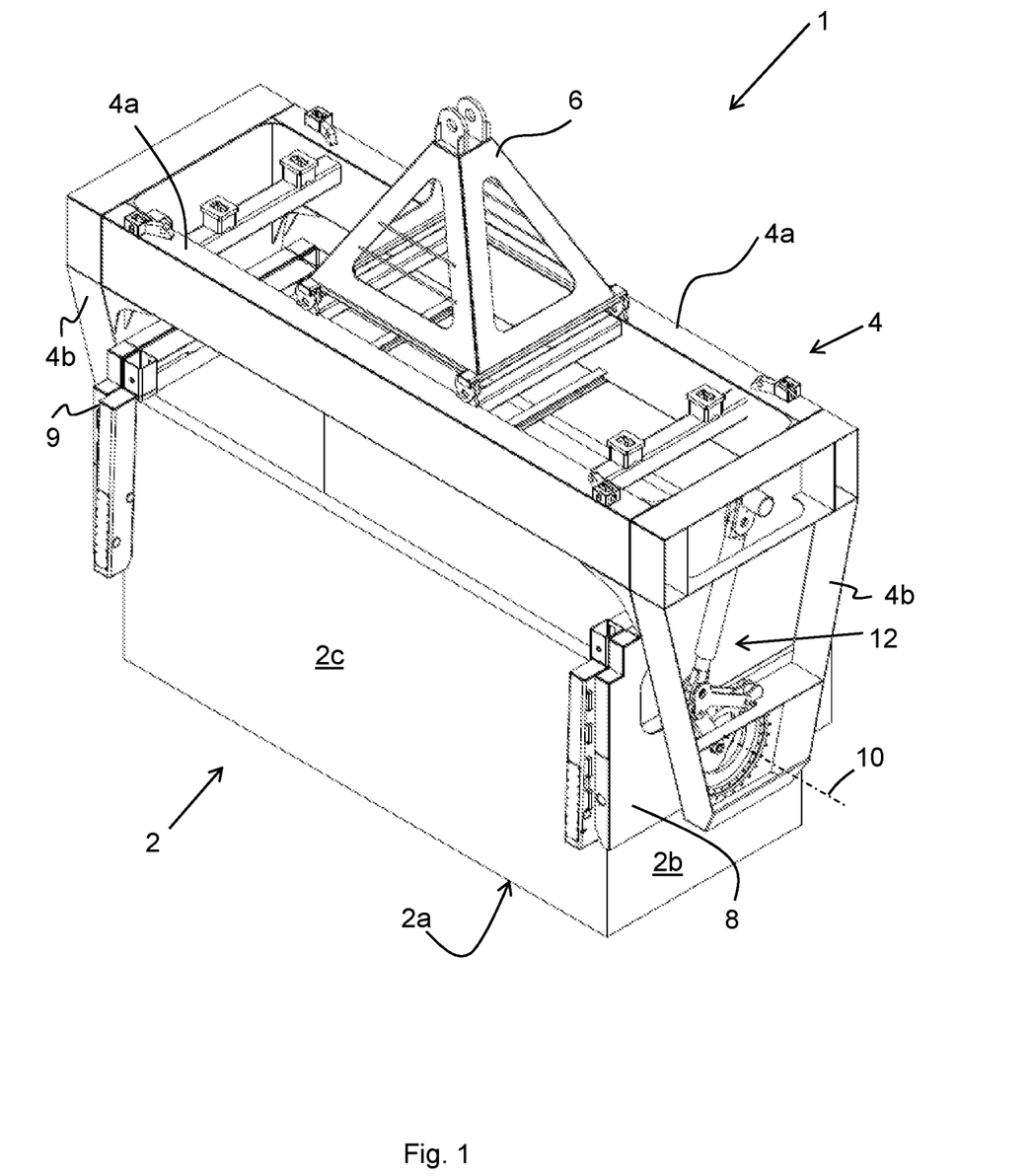
FIG. 1 shows in 3D view an embodiment of a container manipulation device according to the present invention, in a state wherein it engages a container.
Figure 4:
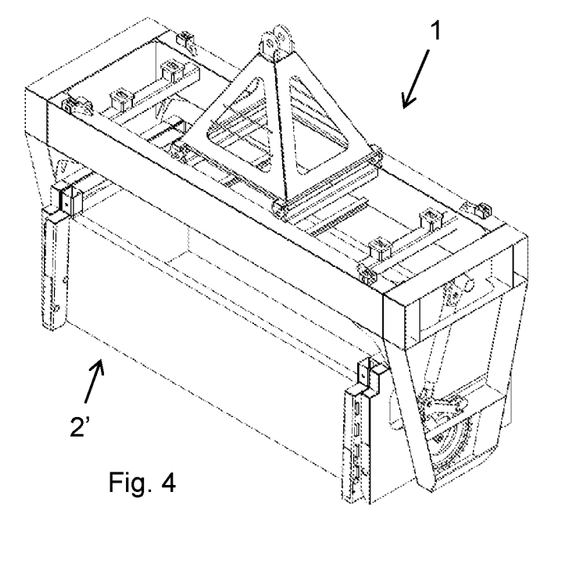
FIG. 4 shows in 3D view the container manipulation device of FIG. 1, in a state wherein it engages a different type of container compared to FIG. 1.

FIG. 1 shows a container manipulation device 1, for manipulation of a bulk material container 2. Such containers 2 typically have an open upper side, although the container may alternatively have a removable lid for closing off the upper side. The container 2 has a bottom 2a and side walls 2b, 2c. The container as shown in FIG. 1 by example, has a height of 2.9 m, which is a standard height in bulk goods transportation. The manipulation device is arranged to handle various types of containers, including at least one other standard type of bulk goods container 2', having a height of 1.8 m, as shown in FIG. 4.

The container manipulation device 1 has a frame 4 on a base part 4a of which a hoisting element 6 is mounted, so that the container manipulation device 1 can be provided on, more specifically suspended from, a hoisting device such as a container crane, or, gantry crane. The hoisting device is represented in a highly schematic and abstract manner by the reference numeral 50 in FIG. 7. The frame 4 is generally of a C-shape in front view, with legs 4b of the C-shape pointing downwards from the horizontally extending base part 4a of the C-shaped frame 4. Instead of the tower-shaped hoisting element 6 as shown, the device 1 may be provided on a hoisting device in any other manner such as suspended from the hoisting device by means of a 4 leg sling (such as wire ropes or chains), or via holes in the frame 4, such as four ISO holes, attached to a spreader or headblock by means of Twistlocks or Munck connection, for example.

Figure 2A:
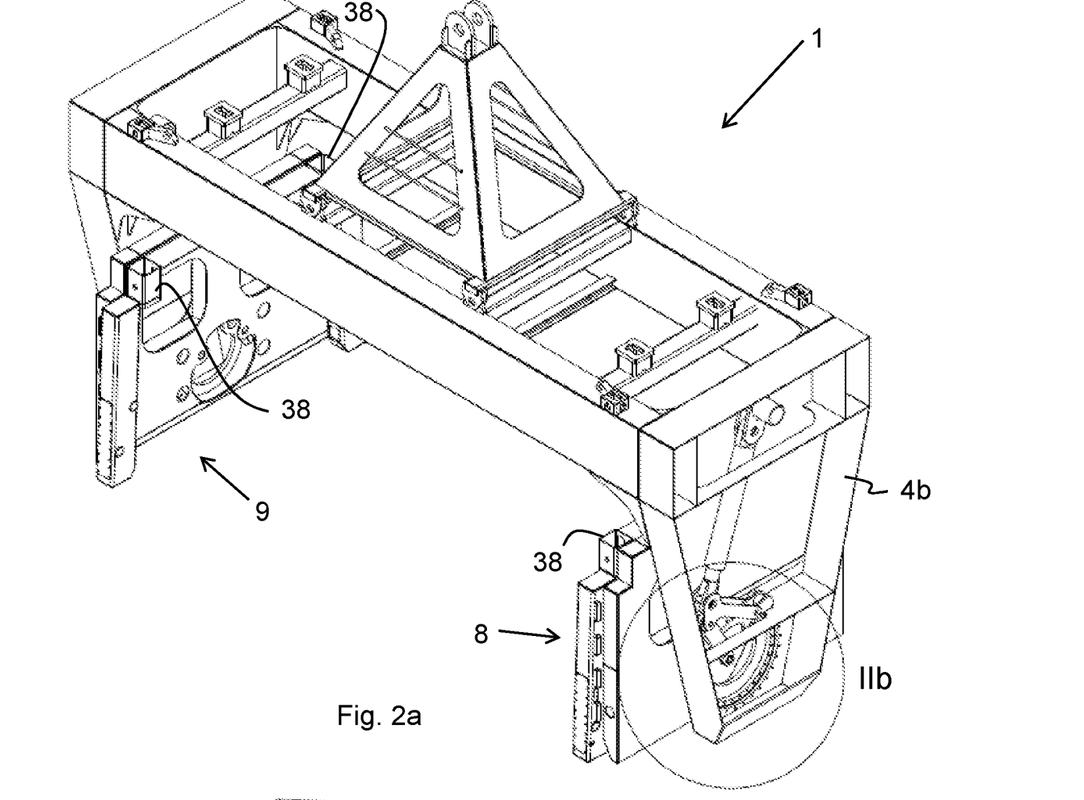
FIG. 2a shows in 3D view the container manipulation device of FIG. 1, in a state wherein it does not engage a container.
Figure 2B:
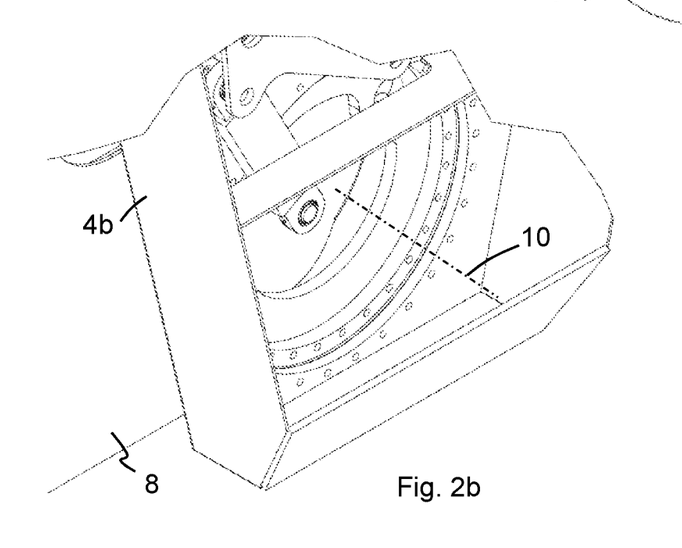
Figure 3:
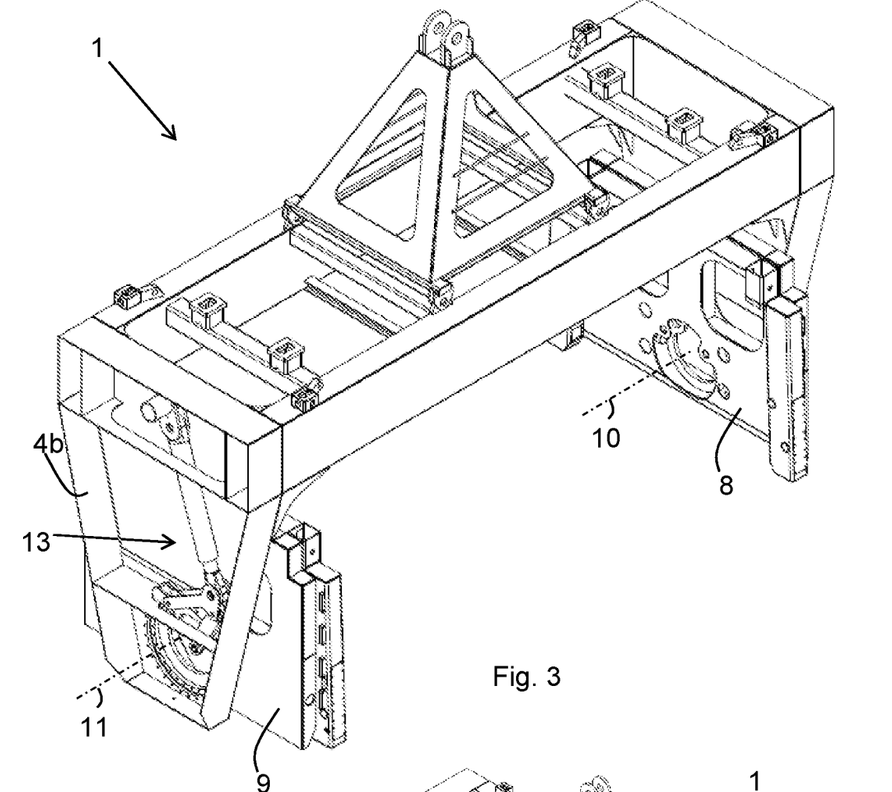
FIG. 3 shows in 3D view the container manipulation device of FIG. 1, seen from the other side compared to FIG. 1.

The container manipulation device 1 further has two container engagement members 8, 9 provided spaced apart on the frame 4. As FIG. 1 shows, the engagement members 8, 9 are provided on inner sides of both legs 4b, facing towards each other. The engagement members 8, 9 are each pivotally connected to the frame 4 about a respective transverse engagement member pivot axis 10, 11. The pivot axes 10, 11 of the two engagement members 8, 9 are coaxial. See also FIGS. 2a, 2b and 3. The engagement members 8 are arranged for engaging the container 2 there between. The engagement members 8, 9 each have a plate-shaped base part and two coupling elements 38, formed as Twistlocks, mounted to the base part such that in use each coupling element 38 can couple to a coupling member at a top corner of the container 2, the engagement member pivot axis 10, 11 being lower than the coupling elements 38 in the first orientation of the engagement members 8, 9.

The device 1 also has two pivoting mechanisms 12, 13, one for each container engagement member 8, 9. The pivoting mechanisms 12, 13 are arranged for pivoting the engagement members 8, 9 with respect to the frame 4 from a first orientation of the engagement members—shown in FIG. 5—in which they, in use, orient the container 2 in an upright orientation wherein an upper side of the container faces upwards, to a second orientation of the engagement members—shown in FIG. 7—in which they, in use, orient the container in an upside-down orientation wherein the bottom of the container faces upwards so that the container may be emptied. FIG. 6 shows an intermediate orientation between said first and second orientation, in which the container is pivoted to a horizontal orientation.

The pivoting mechanisms 12, 13 will be further described below with reference to mechanism 12, which is associated with engagement member 8. Said description also applies to mechanism 13, associated with engagement member 9, in an analogous manner. Mechanism 13 is provided on the other side of the device 1 in a mirror-like fashion, as FIG. 3 in comparison with FIG. 1 shows.

The pivoting mechanism 12 (and thus also mechanism 13) includes an elongate coupler 14, being a rigid arm of fixed length. The coupler 14 is pivotally connected with a first end 14a to the engagement member 8 about a coupler pivot axis 16 located at a first distance D1 from the engagement member pivot axis 10, and having a second, opposite end 14b. More specifically, the first end 14a of the coupler 14 is pivotally coupled to a pivot which is welded on the rotatable inner ring 22 of a slewing bearing 20, the central axis of which forms the engagement member pivot axis 10. The inner ring 22 of the slewing bearing 20 is part of the engagement member 8, more specifically it is fixated thereto, while the outer ring 24 is part of the frame 4, more specifically it is fixated thereto. Since the pivoting mechanisms 12 and 13 are provided in a mirror-like manner on both legs 4b of the frame 4, the inner ring of the slewing bearing is manufactured such that the same component can be used with both engagement members 8, 9. For that purpose the inner ring 22 has an additional connection point 40. As can be understood from FIG. 3, the inner ring 22 of the slewing bearing of the pivoting mechanism 13 associated with engagement member 9 has a coupler which is connected to the inner ring at that connection point 40.

The pivoting mechanism 12 (and thus also mechanism 13) also includes an elongate rocker 26, being a rigid arm of fixed length. The rocker 26 is pivotally connected with a first end 26a to the frame 4, more specifically to the leg 4b of the frame 4, about a rocker pivot axis 28 at a second distance D2 (see FIG. 6) from the engagement member pivot axis 10. According to the example shown in the figures, D2 is greater than D1. The rocker 26 is pivotally connected with an opposite, second end 26b to the second end 14b of the coupler 14 about a rocker-coupler pivot axis 30.

Each pivoting mechanism 12, 13 further has a single actuator 32 for pivoting the rocker 26 about the rocker pivot axis 28 such that the engagement member 8 pivots between the first and second orientation. The actuator 32 is an elongate length-adjustable actuator in the form of an hydraulic cylinder, arranged to pivot the rocker 26 about the rocker pivot axis 28 as a result of an adjustment of the length of the hydraulic cylinder, by means of forcing an hydraulic fluid into or out of the cylinder. The actuator 32 is pivotally connected with a first end 32a thereof to the frame 4 about an actuator pivot axis 34, and pivotally connected to the rocker 26 with an opposite, second end 32b thereof about an actuator-rocker pivot axis 36 at the second end 26b of the rocker 26.

Each of the mentioned pivotal connections relating to the pivot axes 16, 28, 30, 34 and 36 are provided by means of a pivot and/or bearing having the respective pivot axis as the central axis thereof.

Figure 5:
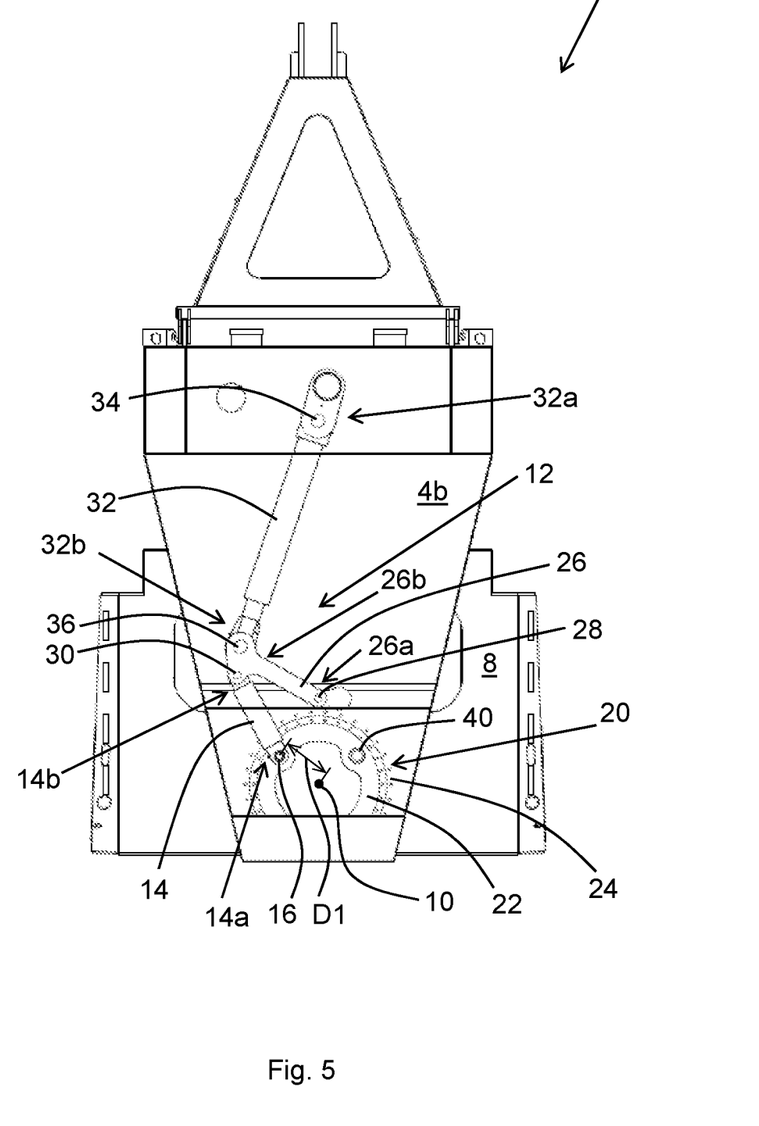
FIG. 5 shows in side view the container manipulation device of FIG. 1, having its container engagement members in the first orientation.
Figure 6:
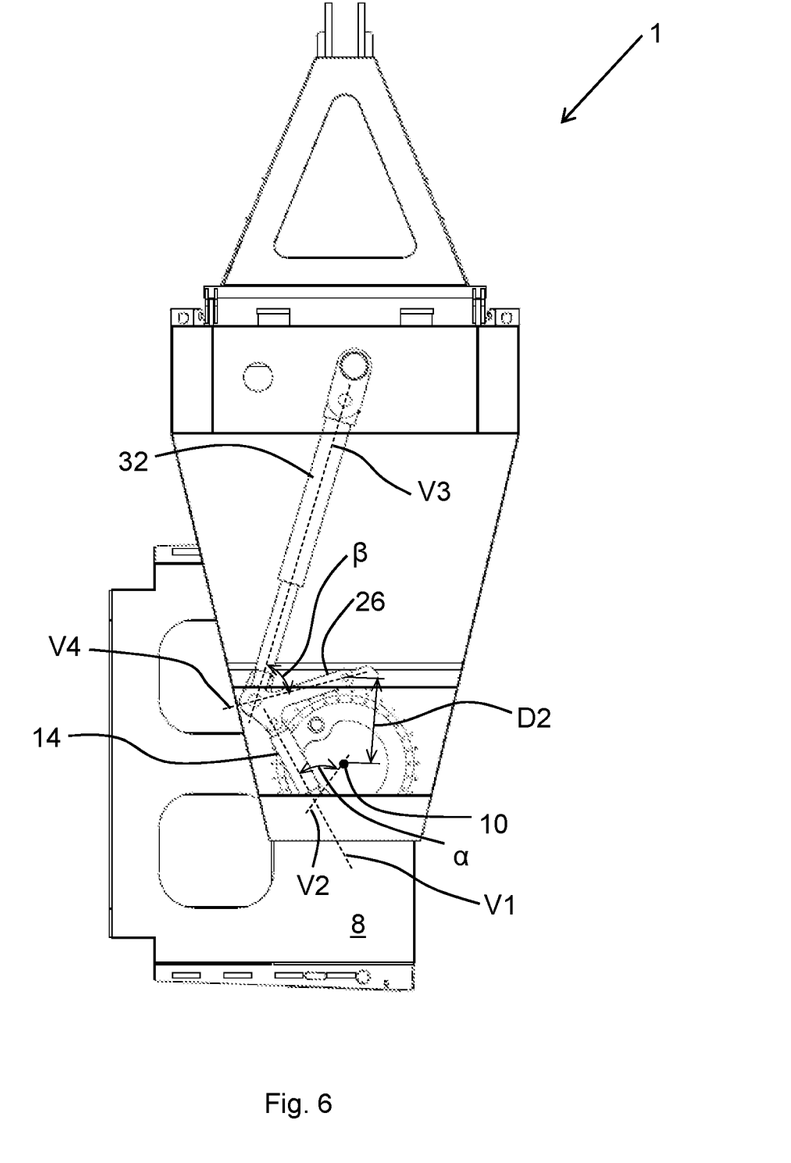
FIG. 6 shows in side view the container manipulation device of FIG. 1, having its container engagement members in an intermediate orientation between the first and second orientations.
Figure 7:
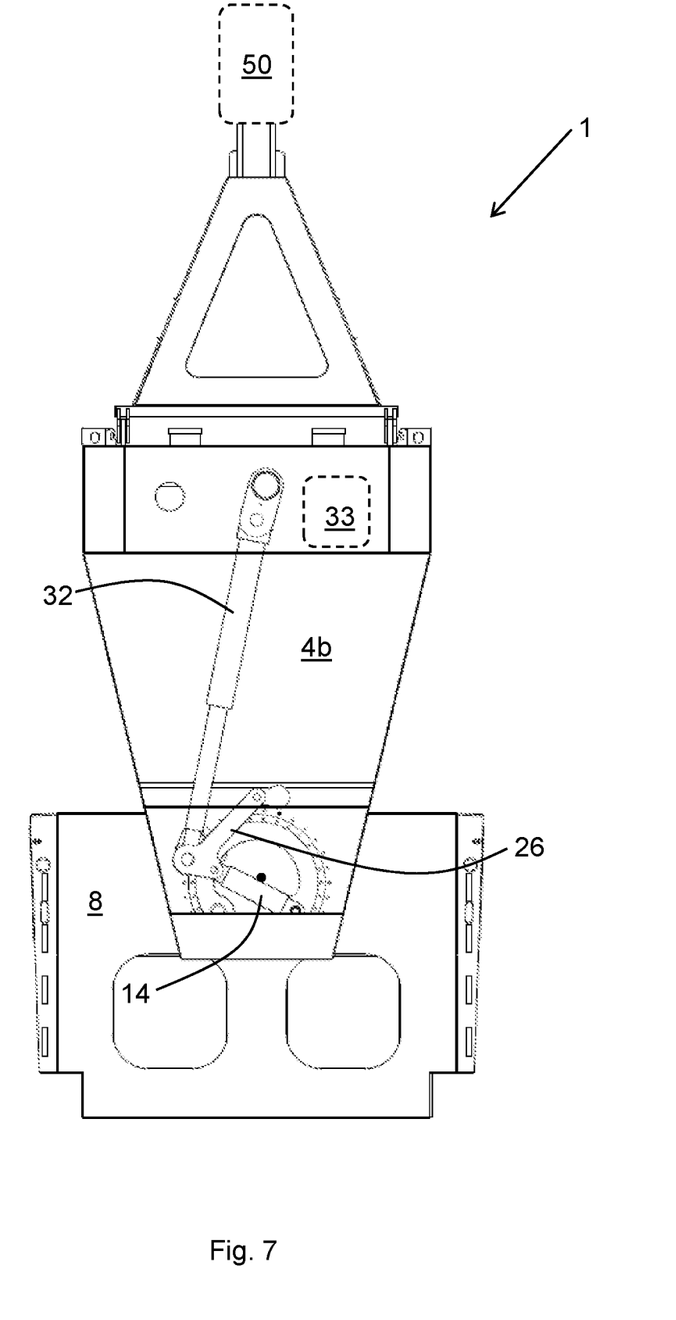
FIG. 7 shows in side view the container manipulation device of FIG. 1, having its container engagement members in the second orientation.

As FIGS. 5, 6 and 7 show, by means of an extension (increase of the length) of the actuator 32 effected by an actuator drive 33 in an automated manner, coupled to the actuator 32, the rocker 26 pivots counter clockwise about the rocker pivot axis 28, in turn setting the coupler 14 in motion so that the inner ring 22 of the slewing bearing 20, and thus also the engagement member 8, pivots counter clockwise about the engagement member pivot axis 10 towards the second orientation thereof. And, by means of a retraction (decrease of the length) of the actuator 32, the rocker 26 pivots clockwise about the rocker pivot axis 28, in turn setting the coupler 14 in motion so that the inner ring 22 of the slewing bearing 20, and thus also the engagement member 8, pivots clockwise about the engagement member pivot axis 10 towards the first orientation thereof. A pivoting angle of the engagement member 8 between the first and second orientation thereof is about 180 degrees, as can be derived from a comparison between FIG. 5 and FIG. 7. The device 1 is configured such that the pivoting motion of the both engagement members 8 and 9 are synchronised. To that end, the device 1 may comprise a single actuator drive 33, actuating the actuators of both the pivoting mechanisms 12, 13 in a synchronous manner. The actuator drive 33 is represented highly schematically and abstract in FIG. 7.

It is noted in this regard that the coupler 14 and the rocker 26 in combination are configured such that in use, during the pivoting of the engagement member 8 between the first and second orientation thereof, a virtual line V1 (see FIG. 6) through the coupler 14, that means, through the coupler pivot axis 16 and the rocker-coupler pivot axis 30 passes along the engagement member pivot axis 10 at all times, that means that said line V1 never approaches the engagement pivot axis 10 such that the distance between both will decrease to zero. As a result, a reliable operation in particular in and near the second orientation is safeguarded. As shown in the view of FIG. 6, and as is also the case in FIGS. 5 and 7, the line V1 passes on the left side of axis 10.

Further, a length of the coupler 14 between the coupler pivot axis 16 and the rocker-coupler pivot axis 30, and a length of the rocker 26 between the rocker pivot axis 28 and the rocker-coupler pivot axis 30, are both greater than the first distance D1 by a factor of about two. Also, a length of the coupler 14 between the coupler pivot axis 16 and the rocker-coupler pivot axis 30, and a length of the rocker 26 between the rocker pivot axis 28 and the rocker-coupler pivot axis 30, are both about equal to the second distance D2.

A transmission angle $\alpha$ of the pivoting mechanism is in the range 140 to 165 degrees in the first orientation of the engagement member 8 and in the range of 10 to 30 degrees in the second orientation of the engagement member, and passes through 90 degrees during the pivoting of the engagement member 8 between the first and second orientation thereof. Or, in other words, the transmission angle $\alpha$ is the angle between the coupler—or at least the virtual line V1 through the coupler pivot axis and the rocker-coupler pivot axis—and an output link, wherein the output link within the context of the present invention is a crank formed by the slewing bearing between the coupler and the engagement member. Said crank, for the purpose of the transmission angle, is defined by a virtual line V2 through the coupler pivot axis and the engagement member pivot axis. See FIG. 6.

The actuator 32 is positioned such that an angle $\beta$ between a virtual line V3 through the actuator pivot axis and the actuator-rocker pivot axis and a virtual line V4 through the rocker pivot axis and the actuator-rocker pivot axis remains between about 35 and 110 degrees during the pivoting of the engagement member 8 between the first and second orientation thereof (about 35 degrees in the second orientation and about 110 degrees in the first orientation).

The device 1 may further comprise a lid lifter (not shown) for lifting a lid of a container comprising a lid in an automated manner prior to or during the pivoting movement of the engagement members, and thus of the container, between the first and second orientation thereof.

Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage.

The foregoing description provides embodiments of the invention by way of example only. The scope of the present invention is defined by the appended claims. One or more of the objects of the invention are achieved by the appended claims.

The invention claimed is:

1. A container manipulation device, for the manipulation of a bulk material container comprising a bottom and side walls, the container manipulation device comprising:
   a frame, configured to be provided on a hoisting device,
   two container engagement members provided spaced apart on the frame, each pivotally connected to the frame by a slewing bearing connected to the frame about a respective transverse engagement member pivot axis, the associated engagement member pivot axis being the central axis of the slewing bearing, the pivot axes of the two engagement members being coaxial, wherein the engagement members are arranged for engaging the container there between,
   two pivoting mechanisms, one for each container engagement member, arranged for pivoting the engagement members with respect to the frame between a first orientation of the engagement members in which the engagement members, in use, orient the container in an upright orientation wherein an upper side of the container faces upwards, and a second orientation of the engagement members in which the engagement members, in use, orient the container in an upside-down orientation wherein the bottom of the container faces upwards so that the container may be emptied, the pivoting mechanisms each including
   an elongate coupler, pivotally connected with a first end to the engagement member about a coupler pivot axis located at a first distance from the engagement member pivot axis, and having a second, opposite end, and the elongate coupler pivotally connected with the first end to a rotatable inner ring of the slewing bearing,
   an elongate rocker, pivotally connected with a first end to the frame about a rocker pivot axis (28), and with an opposite, second end pivotally connected to the second end of the coupler about a rocker-coupler pivot axis, and an actuator for pivoting the rocker about the rocker pivot axis such that the engagement member pivots between the first and second orientation.

2. The container manipulation device according to claim 1, wherein the rocker pivot axis is at a second distance from the engagement member pivot axis, wherein the second distance is greater than the first distance.

3. The container manipulation device according to claim 1, wherein a length of the coupler between the coupler pivot axis and the rocker-coupler pivot axis, and a length of the rocker between the rocker pivot axis and the rocker-coupler pivot axis, are both greater than the first distance.

4. The container manipulation device according to claim 1, wherein a length of the coupler between the coupler pivot axis and the rocker-coupler pivot axis, and a length of the rocker between the rocker pivot axis and the rocker-coupler pivot axis, are both between 0.5 and 1.5 times the second distance.

5. The container manipulation device according to claim 1, wherein a transmission angle of the pivoting mechanism is in the range of 120 to 175 degrees, in the upright orientation of the engagement member and in the range of 5 to 45 degrees, in the upside-down orientation of the engagement member.

6. The container manipulation device according to claim 1, wherein a pivoting angle of the engagement member between the first and second orientation is in the range of 120 to 200 degrees.

7. The container manipulation device according to claim 1, wherein the engagement members each have a plate-shaped base part and two coupling elements mounted to the base part such that in use each coupling element can couple to a coupling member at a top corner of the container, the engagement member pivot axis being lower than the coupling elements in the first orientation of the engagement members.

8. The container manipulation device according to claim 1, wherein the actuator is an elongate length-adjustable actuator.

9. The container manipulation device according to claim 8, wherein the elongate, length-adjustable actuator is pivotally connected with a first end thereof to the frame about an actuator pivot axis, and pivotally connected to the rocker with an opposite, second end thereof about an actuator-rocker pivot axis at the second end of the rocker.

10. The container manipulation device according to claim 9, wherein the actuator is positioned such that an angle between a virtual line through the actuator pivot axis and the actuator-rocker pivot axis and a virtual line through the rocker pivot axis and the actuator-rocker pivot axis remains between 20 and 135 degrees during the pivoting of the engagement member between the first and second orientation thereof.

11. The container manipulation device of claim 1, further comprising a drive for the actuator, arranged to operate the actuator in an automated manner so as to pivot the rocker about the rocker pivot axis.

12. The container manipulation device of claim 1, wherein the frame is generally of a C-shape in front view, with legs of the C-shape pointing downwards from a horizontally extending base part of the C-shape, the engagement members being provided on an inner side of both legs, facing towards each other.

13. A hoisting device provided with a container manipulation device (1) according to claim 1.

* * * * *